Figure 1:
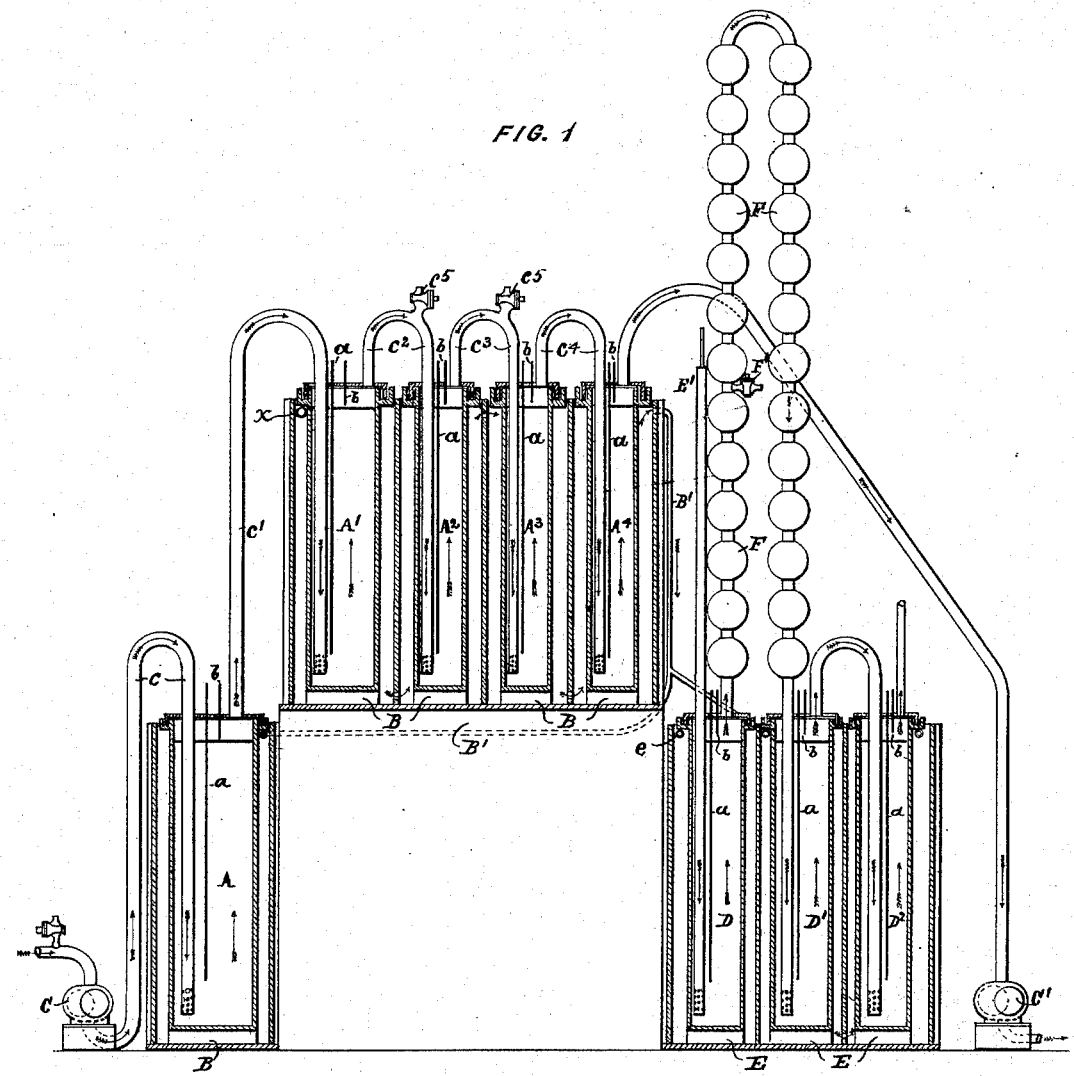

(No Model.)

W. DONALD.
PROCESS OF MAKING CHLORIN.

No. 518,445. Patented Apr. 17, 1894.

Witnesses:
George Baumann

Inventor
William Donald
By his Attorneys
Howson & Howson

UNITED STATES PATENT OFFICE.

WILLIAM DONALD, OF SALTCOATS, SCOTLAND.

PROCESS OF MAKING CHLORIN.

SPECIFICATION forming part of Letters Patent No. 518,445, dated April 17, 1894.

Application filed September 29, 1891. Serial No. 407,137. (No specimens.) Patented in England January 3, 1887, No. 62; in France October 6, 1887, No. 186,261, and in Germany October 12, 1887, No. 45,104.

*To all whom it may concern:*

Be it known that I, WILLIAM DONALD, a subject of the Queen of Great Britain and Ireland, and a resident of Saltcoats, in the county of Ayr, Scotland, have invented certain Improvements in Obtaining Chlorin, (for which I have obtained a British patent, No. 62, dated January 3, 1887; a French patent, No. 186,261, dated October 6, 1887, and a German patent, No. 45,104, dated October 12, 1887,) of which the following is a specification.

My said invention has for its object an improved and economical mode of obtaining chlorin from hydrochloric acid by means of nitric acid.

In carrying out my invention hydrochloric acid gas obtained either directly from the salt cake furnace, from aqueous hydrochloric acid, or from any other suitable source, is dried by passing it in contact with sulfuric acid in a tower or other suitable apparatus; and the dried gas is passed through or in contact with a mixture of strong nitric and sulfuric acids, in any suitable vessel or apparatus hereinafter referred to as the decomposer. The hydrochloric and nitric acids suffer mutual decomposition, the reaction yielding chlorin, lower nitrogen oxid or oxids, and water, which last is absorbed by the sulfuric acid. The relative quantities of the nitric and sulfuric acids must be proportioned to suit the parts each has to perform, the nitric acid having to effect the decomposition of the hydrochloric acid, and the sulfuric acid having to take up the water formed during the reaction, which may be represented by the following equation:

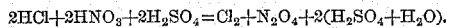

$$2HCl + 2HNO_3 + 2H_2SO_4 = Cl_2 + N_2O_4 + 2(H_2SO_4 + H_2O).$$

The vessel containing the nitric and sulfuric acids ought to be kept at a temperature of about 0° centigrade and the temperatures of the entering hydrochloric acid gas and of the gases leaving the vessel should not exceed 30° centigrade. The gaseous mixture resulting from the operation which has been described is next passed into a vessel termed the first absorber containing dilute nitric acid which absorbs nearly the whole of the nitrogen oxid or oxids, and unaltered hydrochloric acid if there is any. The unabsorbed gases are passed onward through a second vessel or absorber containing dilute nitric acid; and finally any remaining traces of nitrogen oxid or oxids are separated from the chlorin by passing the gas through a scrubber containing sulfuric acid.

The sulfuric acid used in the scrubber may be subsequently used in the decomposer.

The nitric acid used in the absorbers may, when sufficiently charged with nitrogen oxid or oxids, be run into suitable vessels or apparatus in which it is heated and has air passed through it, with the effect that the lower oxid or oxids of nitrogen are reconverted into nitric acid, capable of being used over again in the decomposer.

The sulfuric acid which becomes diluted in the decomposer may be reconcentrated in the ordinary way, or it may be used to decompose fresh quantities of common salt.

The apparatus for carrying on the above process may be varied, the form shown in the accompanying drawings being suitable for the purpose.

Figure 2:
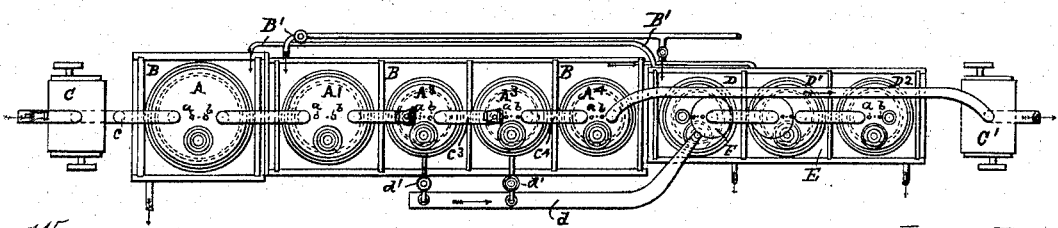

Figure 1 is a sectional elevation, and Fig. 2 a plan of same.

A, A', A², A³, A⁴, are a series of closed cylindrical stoneware vessels, each resting in a tank B through which a continuous flow of refrigerated water or brine entering at $x$ is kept up by means of the pipes B'. Each vessel contains two thermometers $a\ b$, the former being for the purpose of indicating the temperatures of the contained liquids and the other for indicating the temperatures of the issuing gases. The hydrochloric acid gas is forced under pressure of a blower C into the drying vessel A containing the charge of sulfuric acid, the supply pipe $c$ being carried nearly to the bottom of the vessel and being perforated there for the escape of the gas. The dried gas then passes through the pipe $c'$ to the vessel A', which contains the decomposing mixture of nitric and sulfuric acids, thence in succession through the pipes $c^2\ c^3$ and absorbers A² and A³ containing dilute nitric acid, and lastly through the pipe $c^4$ to the scrubber A⁴ containing sulfuric acid. From this scrubber the gas is drawn off by a second blower C'.

D, D' and D² are a second series of vessels similar to the vessels A, A', A², each resting in a tank E. The vessel D is kept heated by hot water entering by the pipe $e$ or by other means, but the other two are cooled by the overflow of refrigerated water or brine from the tanks B. Each vessel D is supplied with two thermometers $a\ b$ for the purposes of ascertaining the temperatures of the contained liquids and the gases. This second series of vessels D, D', D² is for the purpose of converting the lower oxids of nitrogen collected by absorption in the vessels A², A³ into nitric acid. For this purpose the latter vessels are connected with the vessel D by means of a pipe $d$ (Fig. 2) so that the liquid in A², A³ will flow naturally thereinto, when the cocks $d'$ are opened. Before allowing the liquid to flow into the vessel D from A² A³, water may be introduced into the vessels A², A³ through the pipes $c^2\ c^3$ which are provided with stop cocks $c^5$ for the purpose. When in the vessel D the mixture of acid and oxids is heated and a slow current of air passed into the compound through the pipes E', whereby the lower oxids of nitrogen are oxidized into nitric acid. The air passes from the vessel D through a tower F, carrying with it free oxids of nitrogen and these during their progress undergo further oxidation, the necessary water being supplied through a cock F'. The condensed gases flow back into the vessel D and those uncondensed pass into the vessel D', charged with nitric acid, in which the uncondensed gases are absorbed. The air and nitrogen issuing from the vessel D' are scrubbed in the vessel D² containing sulfuric acid, which frees them from all traces of oxids of nitrogen.

If sulfuric acid is used in the vessels A² A³ instead of nitric acid, the nitro-sulfuric acid or nitro-compound formed may be run direct into the vessel D, which is then kept cool, and water or dilute sulfuric acid injected into it, care being taken that the temperature is not allowed to rise.

I claim as my invention—

The process of obtaining chlorin which consists in subjecting dry and cool hydrochloric acid gas to a mixture of strong nitric and sulfuric acids kept at a low temperature, subjecting the resulting chlorin and nitrogen oxid to dilute nitric acid, and finally to strong sulfuric acid, substantially as herein set forth.

In testimony whereof I have signed my name to this specification in the presence of two subscribing witnesses.

WILLIAM DONALD.

Witnesses:
EDMUND HUNT,
DAVID FERGUSON.